(12) United States Patent
Abe et al.

(10) Patent No.: US 7,235,965 B2
(45) Date of Patent: Jun. 26, 2007

(54) MOTOR BEARING WEAR DETECTING DEVICE

(75) Inventors: Masaru Abe, Himeji (JP); Noboru Takahashi, Ibo-gun (JP); Eiji Otake, Himeji (JP)

(73) Assignee: Kabushiki Kaisha Teikoku Denki Seisakusho, Hyogo (JP)

( * ) Notice: Subject to any disclaimer, the term of this patent is extended or adjusted under 35 U.S.C. 154(b) by 209 days.

(21) Appl. No.: 11/035,570

(22) Filed: Jan. 13, 2005

(65) Prior Publication Data

US 2005/0155436 A1 Jul. 21, 2005

(30) Foreign Application Priority Data

Jan. 15, 2004 (JP) ............... 2004-008479

(51) Int. Cl.
*G01B 7/14* (2006.01)
*H01F 5/00* (2006.01)
(52) U.S. Cl. ............................. 324/207.16
(58) Field of Classification Search ..............
324/207.15–207.19, 207.24, 207.22, 207.23;
384/448; 417/423.12
See application file for complete search history.

(56) References Cited

U.S. PATENT DOCUMENTS

| | | | | |
|---|---|---|---|---|
| 4,211,973 A | * | 7/1980 | Sato et al. | 324/772 |
| 4,717,874 A | * | 1/1988 | Ichikawa et al. | 324/207.16 |
| 4,864,232 A | * | 9/1989 | Redlich | 324/207.12 |
| 5,925,951 A | * | 7/1999 | Edwards et al. | 310/68 R |
| 5,955,880 A | * | 9/1999 | Beam et al. | 324/207.17 |
| 6,107,794 A | * | 8/2000 | Kipp et al. | 324/207.23 |
| 6,114,966 A | * | 9/2000 | Eguchi | 340/682 |
| 6,429,781 B2 | * | 8/2002 | Abe et al. | 340/686.3 |
| 7,019,661 B2 | * | 3/2006 | Misato | 340/682 |

FOREIGN PATENT DOCUMENTS

| | | |
|---|---|---|
| JP | 04-248348 | 9/1992 |
| JP | 07-103233 | 4/1995 |

(Continued)

OTHER PUBLICATIONS

Patent Abstracts of Japan for JP-08-043010 published on Feb. 16, 1996.

(Continued)

*Primary Examiner*—Edward Lefkowitz
*Assistant Examiner*—Kenneth J. Whittington
(74) *Attorney, Agent, or Firm*—Darby & Darby (57) ABSTRACT

Reinforcing rings are provided around the cylindrical outer surface of a stator can of a canned motor, near the front and rear ends of a stator of the canned motor respectively. An axial position detecting coil A is wound around the cylindrical outer surface of at least one of the reinforcing rings. The axial position of a rotor is detected by an inductance of the axial position detecting coil A. The axial position detecting coil A is installed by winding a coil around at least one of the reinforcing rings. The invention reduces the influence exerted by change in the radial position of the rotor on the output to the axial position detecting coil A to a negligible level and enables detection of the axial position of the rotor and axial zero adjustment without the necessity of considering change in the radial position of the rotor.

16 Claims, 10 Drawing Sheets

FOREIGN PATENT DOCUMENTS

| | | |
|---|---|---|
| JP | 08-043010 | 2/1996 |
| JP | 10-256894 | 9/1998 |
| JP | 2001-183106 | 7/2001 |
| JP | 2002-153018 | 5/2002 |
| JP | 2002-277522 | 9/2002 |
| JP | 2003-329404 | 11/2003 |
| WO | WO-98/25123 | 6/1998 |

OTHER PUBLICATIONS

Patent Abstracts of Japan for JP-2002-153018 published on May 24, 2002.

Patent Abstracts of Japan for JP-04-248348 published on Sep. 3, 1992.

Patent Abstracts of Japan for JP-2003-329404 published on Nov. 19, 2003.

Patent Abstracts of Japan for JP-10-256894 published on Sep. 25, 1998.

Patent Abstracts of Japan for JP-2002-277522 published on Sep. 25, 2002.

Patent Abstracts of Japan for JP-07-103233 published on Apr. 18, 1995.

Patent Abstracts of Japan for JP-2001-183106 published on Jul. 6, 2001.

* cited by examiner

MOTOR BEARING WEAR DETECTING DEVICE

INCORPORATION BY REFERENCE

The present application claims priority under 35 U.S.C. §119 to Japanese Patent Application No. 2004-008479 filed on Jan. 15, 2004. The content of the application is incorporated herein by reference in its entirety.

BACKGROUND OF THE RELATED ART

1. Technical Field

The present invention relates to a bearing wear detecting device for detecting wear of bearings of a motor.

2. Description of the Related Art

The principal usage of a conventional canned motor is for driving a pump. For example, in case of a canned motor pump, it is not possible to visually observe the interior of the motor, because the canned motor and the pump are formed in an integral body to prevent fluid leakage. An impeller of the pump is rotated by a rotor of the canned pump, which is in many cases supported by bearings that are adapted to be lubricated with pump fluid. In order to operate the canned motor efficiently, it is essential to observe the state of the bearings, i.e. degree of wear, from outside.

There have conventionally been provided various bearing wear detecting devices that call for disposing an axial position detecting coil at each axial end of a stator of a canned motor and comparing the voltages respectively induced in the two axial position detecting coils in order to detect the axial position of a rotor and thereby estimate the amount of axial wear of bearings based on the axial position of the rotor, which is supported by the bearings. The aforementioned voltages are induced in the axial position detecting coils, which are respectively provided at the two axial ends of the stator, by rotation of the rotor when the motor is operated.

An example of bearing wear detecting devices of this type is disclosed in Japanese Patent Laid-open No. 2002-153018, which offers two ways of providing an axial position detecting coil at each axial end of a stator: one of them calls for providing a small core portion by forming notched grooves near the end of a tooth of the stator and winding an axial position detecting coil around the core portion, and the other way calls for providing a space in the surface of each axial end of the stator and disposing therein a core around which an axial position detecting coil is wound.

With such a bearing wear detecting device, in order to precisely detect the axial position of the rotor based on difference between the voltages respectively induced in the axial position detecting coils at the two ends of the rotor, zero adjustment is essential. The aforementioned zero adjustment calls for matching the axial position of the rotor, which is supported by bearings, with the signal representing the difference between the voltages respectively induced in the axial position detecting coils at the two axial ends of the rotor. This matching is done by moving the rotor in either axial direction in the state where rotation of the rotor resulting from operation of the canned motor is inducing voltages on the detection coils. The rotor is moved by an adjusting device or any other appropriate means to move the rotor in an axial direction or a radial direction while the canned motor is operated.

As disclosed in Japanese Laid-open Patent Publication No. 08-43010 and published Japanese translation of PCT International publication No. 2001-505310, there is provided a position detecting device that calls for providing the rotor or the rotor shaft of a canned motor with a position detection target made of a magnetic material, and disposing a plurality of detection coils around a stator can, wherein the detection coils are wound around such a member as a magnetic piece or a core and circumferentially arranged at regular intervals so as to face the cylindrical outer surface of the position detection target. The bearing wear detecting device is adapted to apply high frequency signals to the detection coils during operation of the canned motor, detect the inductances of the detection coils to which the frequency signals have been applied, and determine the axial position as well as the radial position of the rotor based on changes in the inductances of the detection coils.

The conventional bearing wear detecting device described above calls for providing a small core portion by forming notched grooves near the end of a tooth of the stator and winding an axial position detecting coil around the core portion, or providing a space in the surface of each axial end of the stator and disposing therein a core around which an axial position detecting coil is wound. In either case, installation of the axial position detecting coils causes inconvenience and requires a number of man-hours as it necessitates processing of the stator.

Furthermore, voltage induced in each axial position detecting coil is affected by not only the axial position of the rotor but also the radial position of the rotor. Therefore, changes in radial position of the rotor must be taken into consideration to detect the axial position of the rotor or perform axial zero adjustment.

The aforementioned position detecting device is provided with a plurality of detection coils around the stator can. As these detection coils have to be wound around a magnetic piece, a core, or the like, installation of the axial position detecting coils causes inconvenience and requires a number of man-hours. Furthermore, as output from each detection coil is affected also by the radial position of the rotor, changes in radial position of the rotor must be taken into consideration to detect the axial position of the rotor or perform axial zero adjustment.

SUMMARY OF THE INVENTION

A motor bearing wear detecting device according to the present invention comprises an axial position detecting coil that is provided near either one of or both ends of a stator of a motor in such a manner as to be wound around the outer surface of a container that contains partly or entirely a rotor of the motor, and an axial position detecting device for detecting the axial position of the rotor by voltages induced in the axial position detecting coil. As an axial position detecting coil is provided near either one of or both ends of the stator of the motor in such a manner as to be wound around the outer surface of a container that contains partly or entirely the rotor of the motor, and the axial position of the rotor is detected by voltages induced in the axial position detecting coil, the motor bearing wear detecting device according to the present invention not only facilitates the installation of the axial position detecting coil but also enables the reduction of the influence exerted by change in the radial position of the rotor on the output to the axial position detecting coil, for all practical purposes, to a negligible level. Therefore, detection of the axial position of the rotor and axial zero adjustment can be performed easily without having to consider change in the radial position of the rotor.

A motor bearing wear detecting device according to another feature the present invention comprises an axial position detecting coil that is provided near either one of or both ends of a stator of a motor in such a manner as to be wound around the outer surface of a container that contains partly or entirely a rotor of the motor, a high frequency signal applying device for applying high frequency signals to the axial position detecting coil, an inductance detecting device for detecting the inductance of the axial position detecting coil to which a high frequency signal has been applied, and an axial position detecting device for detecting the axial position of the rotor by the inductance of the axial position detecting coil. As an axial position detecting coil is provided near either one of or both ends of the stator of the motor in such a manner as to be wound around the outer surface of a container that contains partly or entirely the rotor of the motor, and the axial position of the rotor is detected by changes in inductance of the axial position detecting coil, the motor bearing wear detecting device according to the present invention not only facilitates the installation of the axial position detecting coil but also enables the reduction of the influence exerted by change in the radial position of the rotor on the output to the axial position detecting coil, for all practical purposes, to a negligible level. Therefore, detection of the axial position of the rotor and axial zero adjustment can be performed easily without having to consider change in the radial position of the rotor. Furthermore, as a result of the configuration that calls for applying high frequency signals to the axial position detecting coil, detecting the inductances of the axial position detecting coil to which the high frequency signal has been applied, and detecting the axial position of the rotor by the inductances of the axial position detecting coil, the bearing wear detecting device according to the invention is capable of detecting the axial position of the rotor regardless of whether the motor is being operated or at a standstill. In other words, it is possible to detect the axial position of the rotor for the purpose of zero adjustment when the motor is at a standstill.

The axial position detecting device has a temperature measuring device and a temperature correction device, the temperature measuring device serving to measure the temperature of the axial position detecting coil, and the temperature correction device serving to perform temperature correction based on the temperature measured by the temperature measuring device. This configuration enables the precise detection of the axial position of the rotor through negation of the influence exerted by the temperature of the axial position detecting coil.

The high frequency signal applying device serves to apply a high frequency signal to the axial position detecting coil, the high frequency signal being generated by superimposing DC current over a sine wave, wherein the DC current has the same value as the effective value of the sine wave. The motor bearing wear detecting device has a sine wave signal detecting device and a DC resistance detecting device, the sine wave signal detecting device serving to detect a sine wave signal from among the signals output from the axial position detecting coil, to which the high frequency signal has been applied, and the DC resistance detecting device serving to detect a DC resistance value from among the signals output from the axial position detecting coil, to which the high frequency signal has been applied. The inductance detecting device serves to detect an inductance of the axial position detecting coil, the aforementioned inductance being a sine wave signal detected by the sine wave signal detecting device after subtracting therefrom the DC resistance value detected by the DC resistance detecting device. With the configuration as above, a motor bearing wear detecting device is capable of eliminating the influence of the temperature of the axial position detecting coil, resulting in precise detection of the axial position of the rotor.

The aforementioned container is either a stator can or a reinforcing ring that is provided around the stator can. In either case, an axial position detecting coil can be easily wound around the container.

A magnetic member is provided at an end of the rotor, where an axial position detecting coil is located. This configuration increases sensitivity of the axial position detecting coil and thereby ensures precise detection of the axial position of the rotor.

DETAILED DESCRIPTION OF THE PREFERRED EMBODIMENT

Next, an embodiment of the present invention is explained hereunder, referring to relevant drawings.

Figure 1:
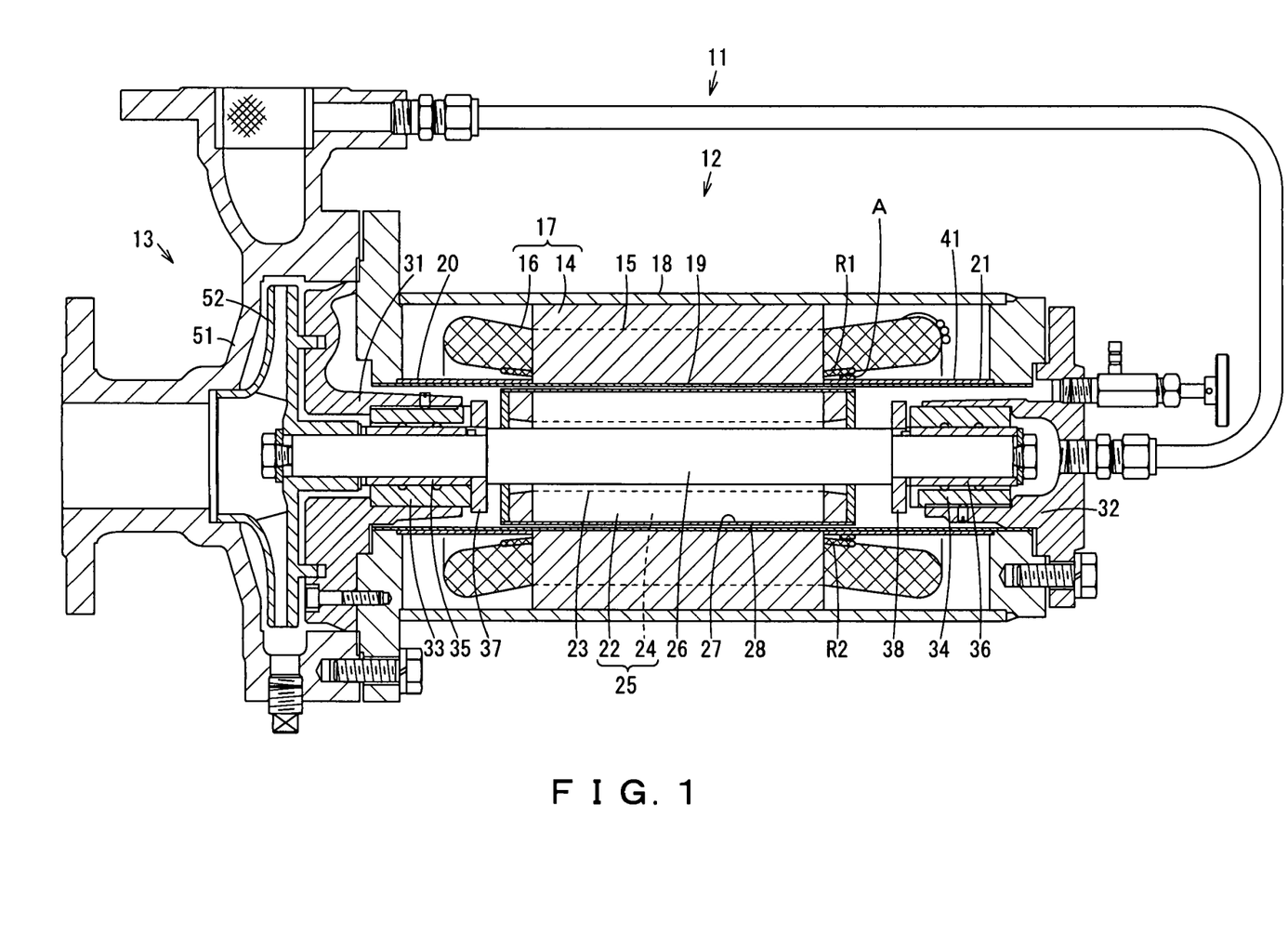
FIG. 1 is a sectional view of a canned motor pump that employs a bearing wear detecting device according to an embodiment of the present invention.

Referring to FIG. 1, numeral 11 denotes a canned motor pump comprised of a canned motor 12, which serves as the motor referred to in the claims and the summary of the invention, and a pump 13. The canned motor 12 and the pump 13 are integrally connected in a fluid-tight state.

The canned motor 12 has a stator 17, which is comprised of a stator core 14 and stator windings 16 respectively wound along stator grooves 15 of the stator core 14. The stator 17 is fitted in a stator frame 18. A stator can 19, which is formed of such a non-magnetic material as stainless steel in a thin-walled tubular shape, is tightly fitted in the stator 17. The two axial ends of the stator can 19 are welded to the stator frame 18 in a fluid-tight state. Reinforcing rings 20,21 for reinforcing the stator can 19 are fitted around the stator can 19. Each reinforcing ring 20,21 is provided between the stator core 14 and each axial end of the stator frame 18.

The canned motor 12 has a rotor 25 that is comprised of rotor conductors 24 respectively fitted in rotor grooves 23 of a rotor core 22. The rotor 25 is fitted to a rotor shaft 26. A rotor can 27, which is formed of such a non-magnetic material as stainless steel in a thin-walled tubular shape, is fitted around the cylindrical outer surface of the rotor 25.

The rotor 25 is inserted in the stator 17 so that the stator can 19 of the stator 17 and the rotor can 27 of the rotor 25 oppose each other with can gap 28 therebetween.

Bearing boxes 31,32 are respectively attached to the front end and the opposite end, i.e. the rear end, of the stator frame 18. The front end of the stator frame 18 is the end facing the pump 13. Bearings 33,34, which are slide bearings rotatably supporting the rotor shaft 26 are respectively attached to the bearing boxes 31,32. Sleeves 35,36 for supporting the rotor 25 and thrust collars 37,38 are attached to the bearings 33,34 so that the rotor 25 is rotatably supported by the bearings 33,34 through the sleeves 35,36 and that the axial movement of the rotor 25 is limited by the thrust collars 37,38 and the bearings 33,34.

Figure 2:
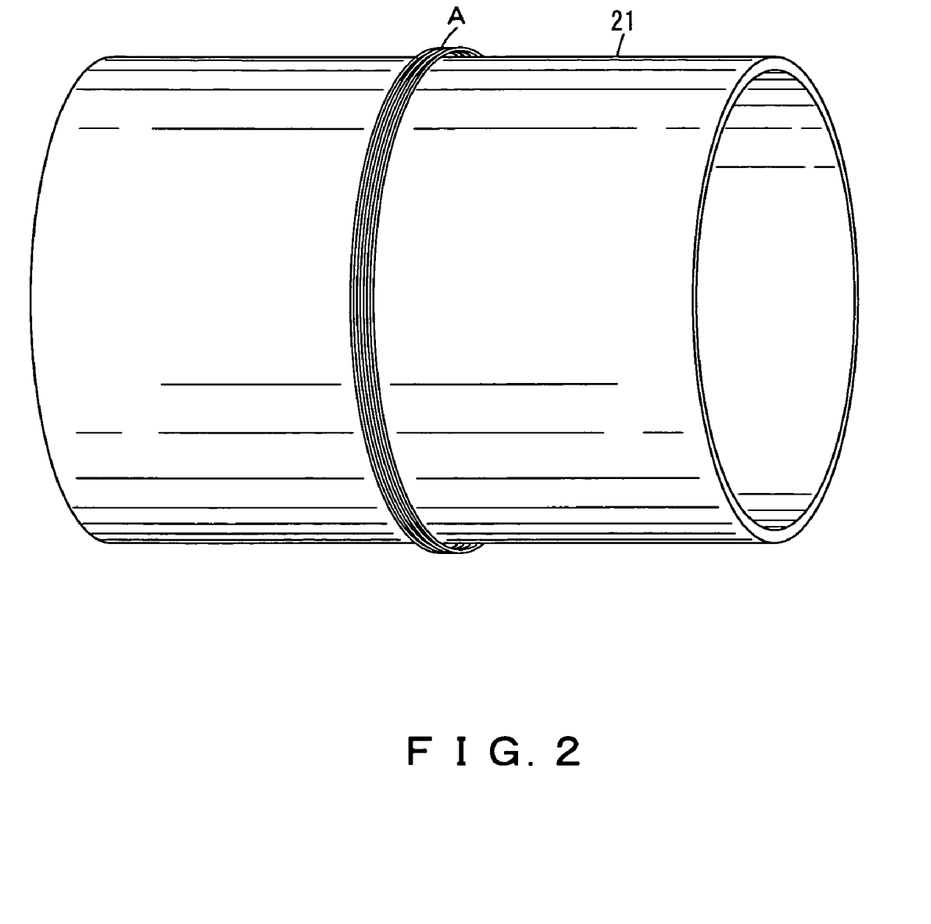
FIG. 2 is a perspective of a reinforcing ring and an axial position detecting coil of the bearing wear detecting device.

As shown in FIGS. 1 and 2, near the rear end of the stator 17 of the canned motor 12, an axial position detecting coil A is wound around the cylindrical outer surface of the reinforcing ring 21, which serves as a container 41 for containing an end portion of the rotor 25. The axial position detecting coil A is positioned around the portion of the container 41 where the rear end of the rotor 25 is located.

A radial position detecting coil R1,R2 is wound along the entire axial length of each of two opposing teeth of the stator core 14 of the stator 17, i.e. teeth that oppose each other at a 180° angle.

The pump 13 has a casing 51, which is attached in a fluid-tight state to the stator frame 18 of the canned motor 12, and an impeller 52, which is mounted to the rotor shaft 26 inside the casing 51. The impeller 52 in the pump 13 is adapted to be rotated by the rotor 25, which is supported by the bearings 33,34 through the sleeves 35,36. The axial movement of the impeller 52 is limited by the thrust collars 37,38 and the bearings 33,34.

Figure 3:
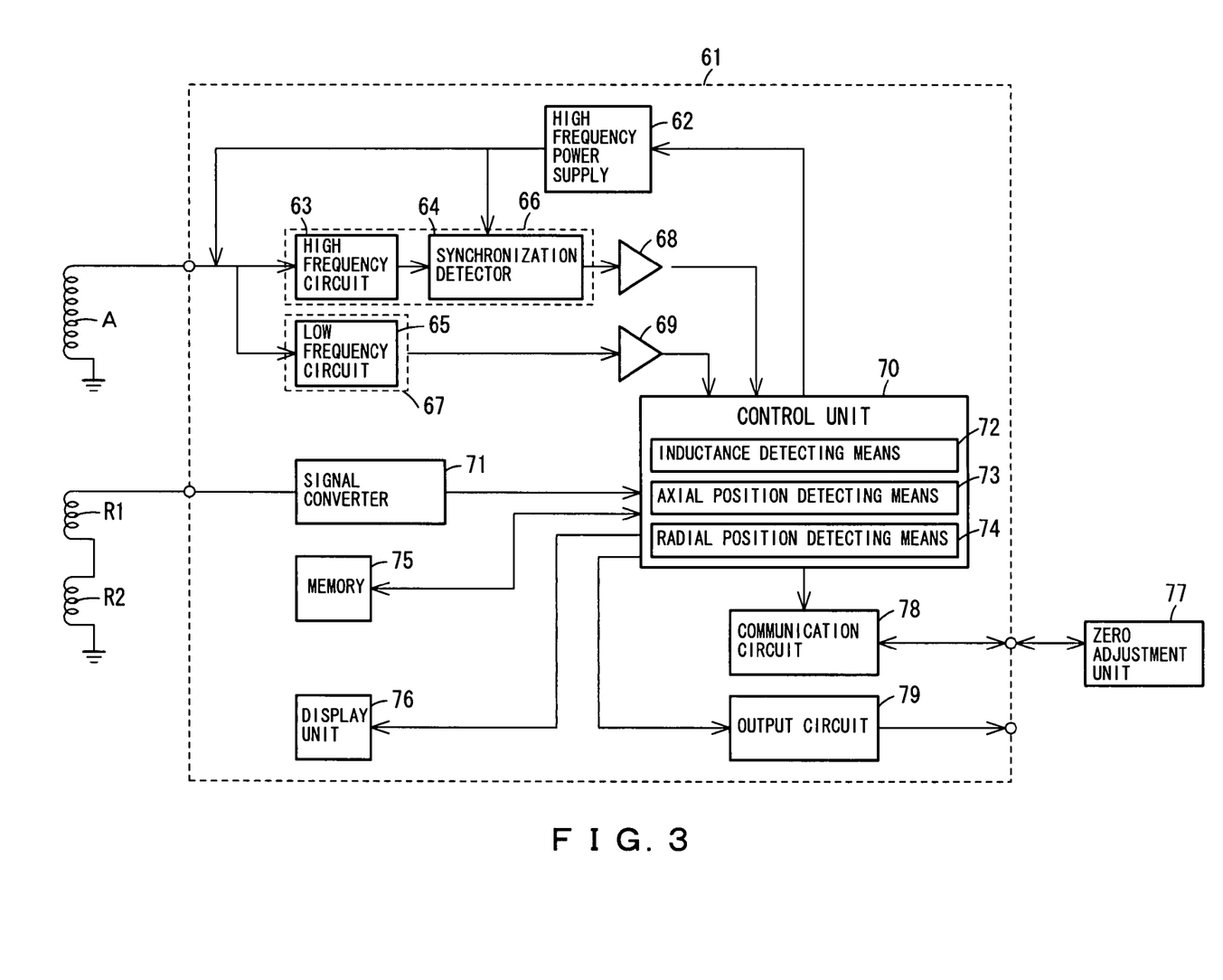
FIG. 3 is a circuit diagram of the bearing wear detecting device.

A circuit diagram of the bearing wear detecting device is shown in FIG. 3.

Numeral 61 denotes a control circuit of the bearing wear detecting device. The aforementioned radial position detecting coils R1,R2 are connected in series in order to cancel fundamental waves. An end of the axial position detecting coil A and one end of a series circuit of the radial position detecting coils R1,R2 are connected to the control circuit 61. The other ends of the axial position detecting coil A and the series circuit of the radial position detecting coils R1,R2 are grounded to a common terminal.

High frequency signals are applied from a high frequency power supply 62, which serves as a high frequency signal applying device, to the end of the axial position detecting coil A that is connected to the control circuit 61. These high frequency signals are AC signals generated by superimposing DC current over sine waves, the DC current having the same value as the effective value of these sine waves. The sine waves have a frequency higher than the power supply frequency of the electric power for driving the canned motor 12 and also higher than the high frequency signals that are generated in association with the rotation speed and the number of grooves of the rotor 25. The aforementioned end of the axial position detecting coil A is connected to a synchronous detector 64 through a high frequency circuit 63 and also connected to a low frequency circuit 65.

The high frequency circuit 63 has a high frequency filter, such as a band pass filter, that passes only sine wave signals from among signals output from the axial position detecting coil A. The synchronous detector 64 picks up sine wave signals that are synchronized with the high frequency signals obtained from the high frequency power supply 62. The high frequency circuit 63 and the synchronous detector 64 constitute a sine wave signal detecting device 66 for detecting sine wave signals from among the signals output from the axial position detecting coil A.

The low frequency circuit 65 has a low frequency filter, such as a low pass filter, and constitute a DC resistance detecting device 67 for detecting DC resistance values by passing only DC signals from among signals output from the axial position detecting coil A.

Sine wave signals from the synchronous detector 64 and DC resistance signals from the low frequency circuit 65 are amplified by an amplifier 68 and an amplifier 69 respectively and input into a control unit 70.

The radial position detecting coils R1,R2 are connected in series so as to detect the radial position of the rotor 25 based on the difference in induced voltages. An end of the series circuit of the radial position detecting coils R1,R2 is connected to a signal converter 71 of the control circuit 61 so that radial position signals from the radial position detecting coils R1,R2 are input through the signal converter 71 into the control unit 70.

The control unit 70 functions as an inductance detecting device 72, an axial position detecting device 73, and a radial position detecting device 74. The inductance detecting device 72 serves to detect an inductance of the axial position detecting coil A to which a high frequency signal has been applied, wherein the inductance of the axial position detecting coil A is represented by a sine wave signal detected by the sine wave signal detecting device 66 after subtracting therefrom the DC resistance value detected by the DC resistance detecting device 67. The axial position detecting device 73 serves to detect an axial position of the rotor 25 based on an inductance of the axial position detecting coil A. The radial position detecting device 74 serves to detect a radial position of the rotor 25 based on a difference between voltages respectively induced in the radial position detecting coils R1,R2.

A memory 75 and a display unit 76, too, are connected to the control unit 70. The memory 75 serves to store programs and data for detecting the axial position and radial position of the rotor 25 and determining the state of wear of the bearings 33,34. The data stored in the memory 75 also include reference values set as a result of zero adjustment. The display unit 76 serves to display the state of wear of the bearings 33,34.

The control unit 70 is also connected to a communication circuit 78 and an output circuit 79. The communication circuit 78 is provided for communication with a zero adjustment unit 77, which serves to perform zero adjustment for matching the position of the rotor 25 with initial outputs from the axial position detecting coil A and from the radial position detecting coils R1,R2. The output circuit 79 serves to output data, such as wear signals, to such external devices as a monitor or a computer.

Next, how the bearing wear detecting device performs zero adjustment for detection of axial bearing wear is explained hereunder.

When operation of the canned motor 12 is at a standstill, a high frequency signal is applied from the high frequency power supply 62 to the axial position detecting coil A to energize the axial position detecting coil A so that the axial position detecting coil A outputs a signal corresponding to the position of the rotor 25. From the output of the axial position detecting coil A, the sine wave signal that is synchronized with the high frequency signal obtained from the high frequency power supply 62 is picked up by the high frequency circuit 63 and the synchronous detector 64, and the DC resistance signal is picked up by the low frequency circuit 65. The sine wave signal and the DC resistance signal that have been picked up are input into the control unit 70.

In this state, in order to perform zero adjustment for axial bearing wear, the rotor 25 is moved in either axial direction, for example rearward, until its movement is restrained by the thrust collar 38 and the bearing 34. The operating element of the zero adjustment unit 77 is then operated so that various values to be input into the control unit 70, including the sine wave signal from the axial position detecting coil A, the DC resistance signal, and the inductance obtained by subtracting the value of the DC resistance from the sine wave signal, are stored as the rearward reference values in the memory 75.

The rotor 25 is moved forward along the axial direction until its movement is restrained by the thrust collar 37 and the bearing 33, and the operating element of the zero adjustment unit 77 is operated so that various values to be input into the control unit 70, including the sine wave signal from the axial position detecting coil A, the DC resistance signal, and the inductance obtained by subtracting the value of the DC resistance from the sine wave signal, are stored as the forward reference values in the memory 75.

The operating element of the zero adjustment unit 77 is operated to input and store in the memory 75 the value that represents the axial allowance of the rotor 25.

The temperature of the axial position detecting coil A is measured with a thermometer. The operating element of the zero adjustment unit 77 is operated so that the initial temperature is input to be stored in the memory 75. The inclusion of functions of outputting and displaying a temperature enables the bearing wear detecting device to display the temperature of the detection coil when such an initial adjustment as described above is performed.

Next, how the bearing wear detecting device performs axial bearing wear detection when the canned motor pump 11 is operated is explained hereunder.

When the canned motor 12 is being operated, a high frequency signal is applied from the high frequency power supply 62 to the axial position detecting coil A so that the axial position detecting coil A is energized and outputs a signal corresponding to the position of the rotor 25. From the output of the axial position detecting coil A, the high frequency circuit 63 and the synchronous detector 64 pick up only the sine wave signal that is synchronized with the high frequency signal obtained from the high frequency power supply 62 by removing all frequencies except the high frequency signal applied to the axial position detecting coil A, and the low frequency circuit 65 picks up the DC resistance signal by passing only the signal representing DC resistance. The sine wave signal and the DC resistance signal that have been picked up are input into the control unit 70.

The control unit 70 determines the state of wear of the bearings 33,34 by calculation using the input sine wave signal and DC resistance signal. The calculation by the control unit 70 is explained hereunder, referring to the flow chart shown in FIG. 4.

Figure 4:
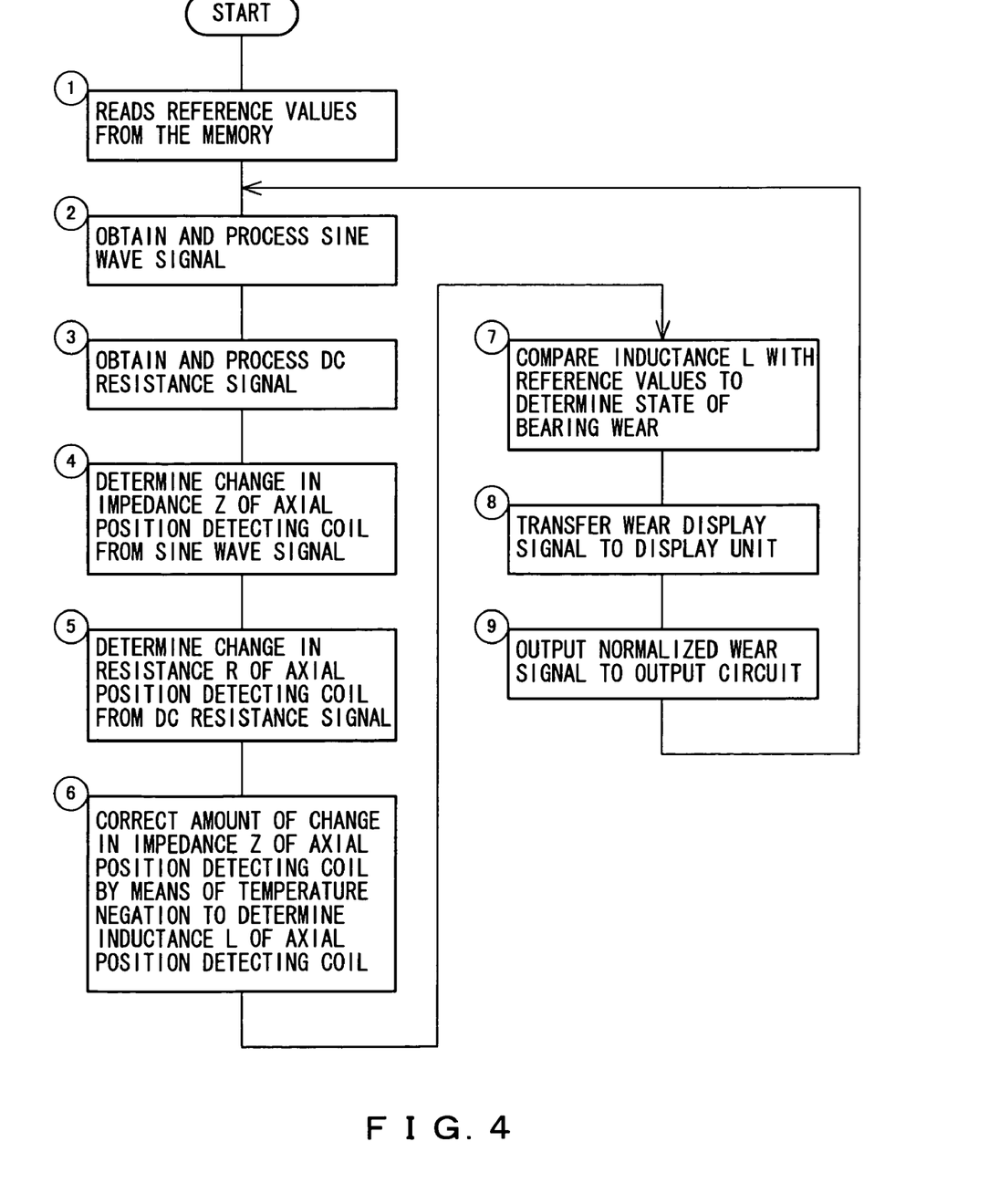
FIG. 4 is a flow chart to explain the process of detecting wear of the bearings by the bearing wear detecting device.

The control unit 70 reads from the memory 75 the reference values that have been stored in the memory 75 beforehand as a result of zero adjustment (Step 1), thereby obtaining a sine wave signal, which is a rotor position signal to be input into the control unit 70, (Step 2) and a DC resistance signal, which is a temperature correction signal to be input into the control unit 70, (Step 3).

The change in the impedance Z of the axial position detecting coil A is determined from the sine wave signal (Step 4), and the change in the resistance R of the axial position detecting coil A is calculated from the DC resistance signal (Step 5).

By subtracting the amount of the change in the resistance R from the impedance Z of the axial position detecting coil A to negate the temperature, the change in the inductance L of the axial position detecting coil A is determined (Step 6).

By comparing the inductance L of the axial position detecting coil A with reference values, the state of wear of each bearing 33,34 is determined (Step 7).

Wear display signals corresponding to the state of wear of the bearings 33,34 are transferred to the display unit 76 to display the state of bearing wear on the display unit 76 (Step 8), and normalized wear signals are output to the output circuit 79 (Step 9).

Figure 5:
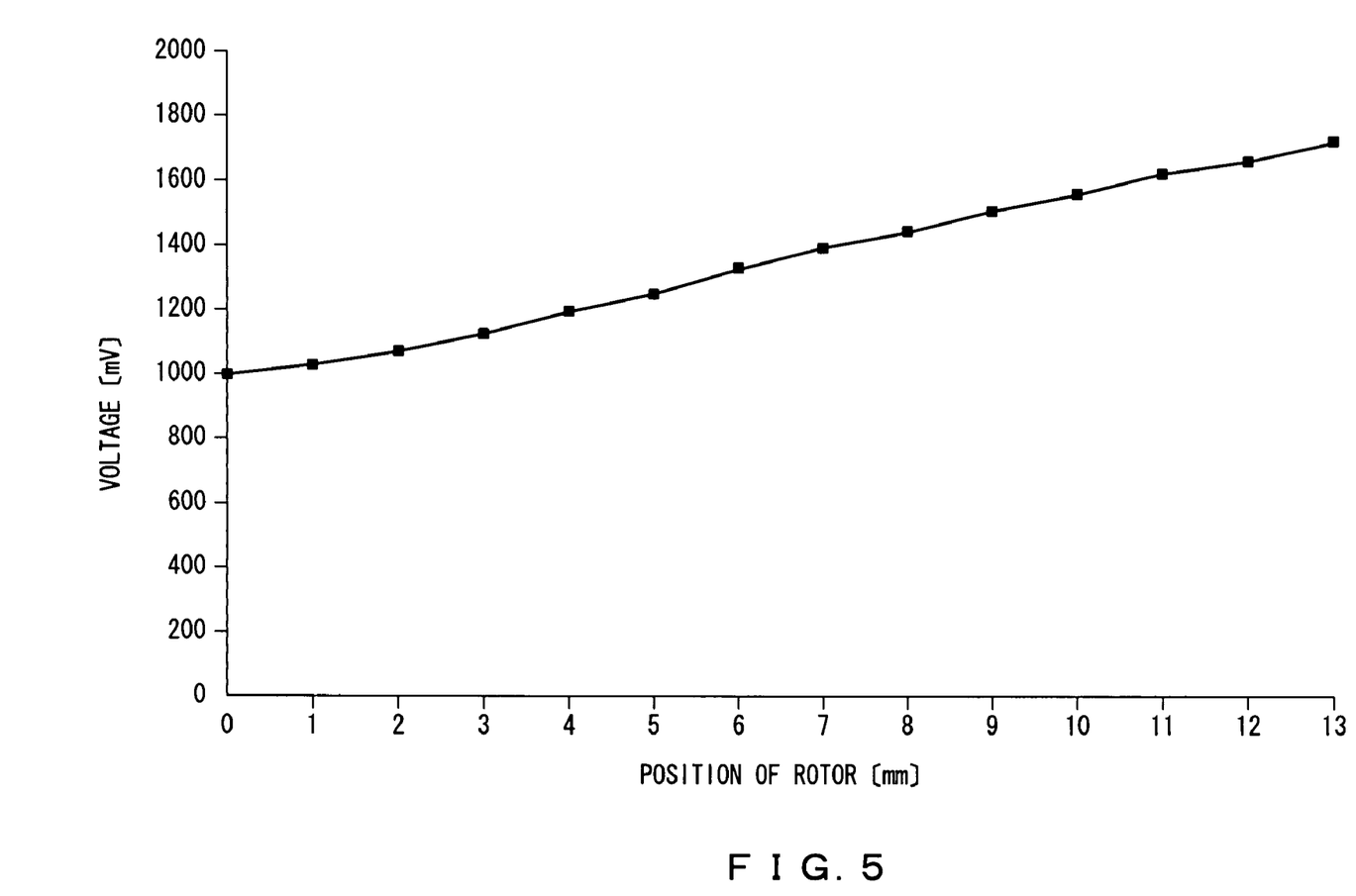
FIG. 5 is a graph showing changes in outputs from the bearing wear detecting device representing output of axial wear signals when axial wear causes the rotor to move rearward.

FIG. 5 is a graph showing outputs from the output circuit 79 in the situation where axial wear causes the rotor 25 to move rearward. The horizontal axis and the vertical axis in the graph respectively represent axial positions of the rotor 25 and voltages of wear signals output to the output circuit 79.

Next, temperature correction is explained.

A high frequency signal that is obtained by superimposing direct current over a sine wave is applied to the axial position detecting coil A. As a result of this application of a high frequency signal, the following output signal Vz is obtained from the axial position detecting coil A:

$$Vz = RI_1 + j\omega LI_1 + RI_2$$

R: DC resistance of the detection coil
$I_1$: effective value of sine wave current
$\omega$: angular frequency of sine wave current
L: inductance of the detection coil
$I_2$: value of DC current The output signal Vz is divided into a sine wave signal $V_L$ through the high frequency circuit 63 and the synchronous detector 64, and a DC signal $V_R$ through the low frequency circuit 65.

$$V_L = RI_1 + j\omega LI_1$$

$$V_R = RI_2$$

As a high frequency signal obtained by superimposing direct current over a sine wave so as to achieve $I_1 = I_2$ has been applied to the axial position detecting coil A, a signal $V_O$ representing the inductance of the axial position detecting coil A that is not affected by the temperature is obtained by subtracting the DC signal $V_R$ from the sine wave signal $V_L$ in order to exclude the signal representing the resistance of the axial position detecting coil A.

$$V_O = j\omega LI_1$$

The signal $V_O$ representing the inductance of the axial position detecting coil A that is not affected by the temperature enables the precise detection of bearing wear.

Next, detection of radial bearing wear is explained hereunder. When the canned motor 12 is being operated, fundamental wave components of signals that represent the voltages induced on the respective radial position detecting coils R1,R2 cancel each other so that the difference in high frequency signals generated from the respective radial position detecting coils R1,R2 in association with the rotation speed and the number of grooves of the rotor 25 is input into the control unit 70. The radial bearing wear of the rotor 25 is calculated from the aforementioned difference in high frequency signals.

Figure 6:
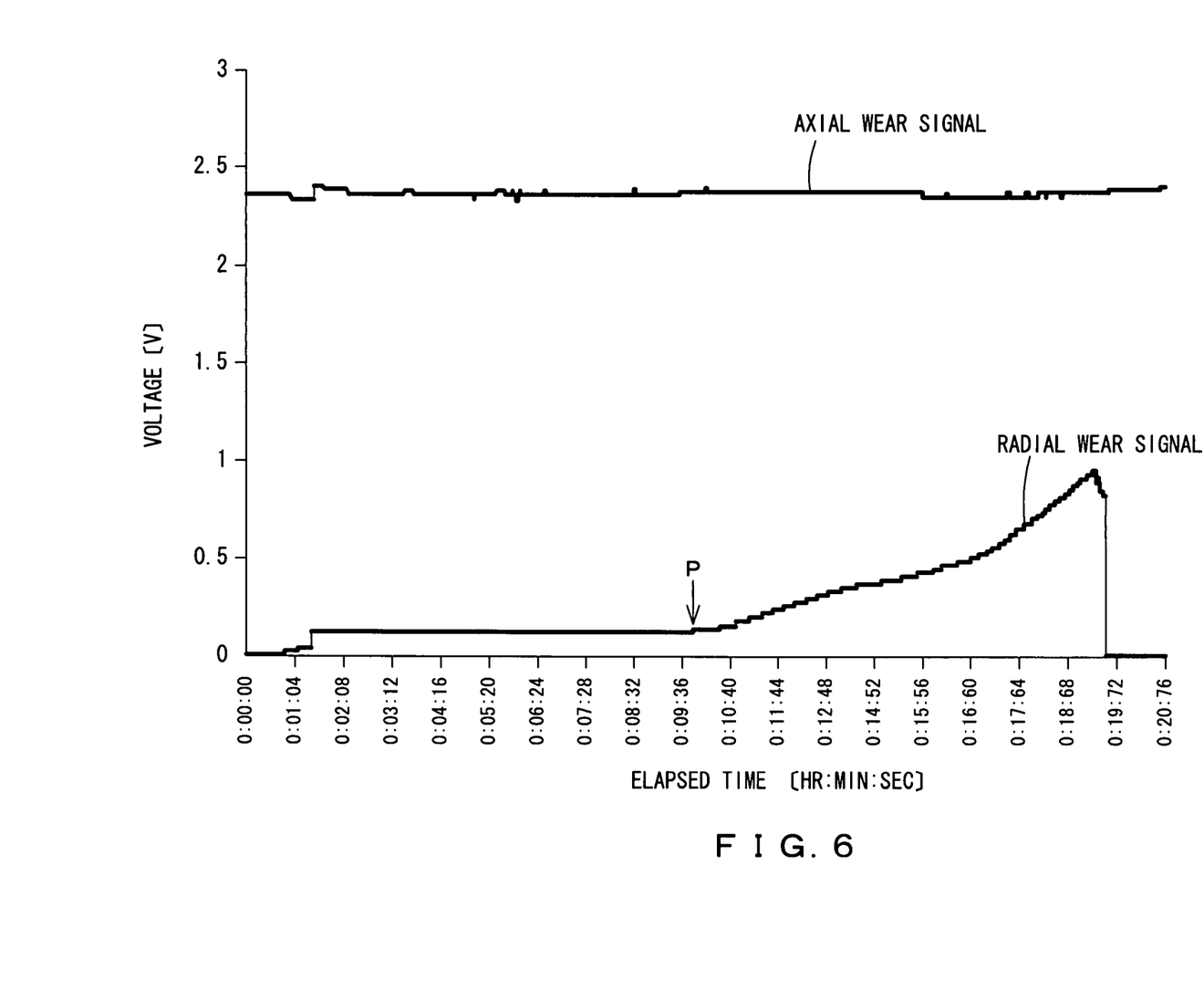
FIG. 6 is a graph showing changes in outputs from the bearing wear detecting device representing output of axial wear signals and radial wear signals when radial wear has occurred.

FIG. 6 is a graph showing changes in outputs of axial wear signals and radial wear signals in the situation where radial wear has occurred. The horizontal axis and the vertical axis in the graph respectively represent elapsed time and voltage of wear signals output to the output circuit 79. In cases where there is radial bearing wear, the load of the pump fluid applied to the pump 13 at Timing P as a result of activation of the canned motor 12 causes the rotor 25 to move in the radial direction, resulting in increase in radial wear signal. However, the axial wear signals virtually remain constant, without being affected by the pump fluid load.

As described above, the axial position detecting coil A is wound, near the rear end of the stator 17, around the cylindrical outer surface of the reinforcing ring 21, which serves as a container 41 to house the rotor 25, and the axial position of the rotor 25 is detected by a change in the inductances of the axial position detecting coil A. Such a configuration not only facilitates the installation of the axial position detecting coil A but also enables the reduction of the influence exerted by change in the radial position of the rotor 25 on the output to the axial position detecting coil A, for all practical purposes, to a negligible level. Therefore, detection of the axial position of the rotor 25 and axial zero adjustment can be performed easily without having to consider change in the radial position of the rotor 25.

Furthermore, the embodiment described above calls for applying a high frequency signal to the axial position detecting coil A, detecting the inductances of the axial position detecting coil A to which this high frequency signal has been applied, and detecting the axial position of the rotor 25 by the inductances of the axial position detecting coil A. Such a configuration enables the detection of the axial position of the rotor 25 regardless of whether the canned motor 12 is being operated or at a standstill. In other words, it is possible to detect the axial position of the rotor 25 for the purpose of zero adjustment when the canned motor 12 is at a standstill.

Therefore, zero adjustment can be easily performed during the production of the canned motor 12, which results in increased productivity, or at a site where the canned motor 12 is used, after conducting such maintenance operation as changing a bearing or the rotor, or tightening a gasket.

Furthermore, the embodiment described above calls for applying to the axial position detecting coil A a high frequency signal over which direct current has been superimposed, detecting a sine wave signal and DC resistance from the output of the axial position detecting coil A to which this high frequency signal has been applied, and detecting an inductance of the axial position detecting coil A obtained by subtracting the DC resistance value from the sine wave signal detected as above. By thus eliminating the influence of the temperature of the axial position detecting coil A, this configuration enables the precise detection of the axial position of the rotor 25.

Figure 7:
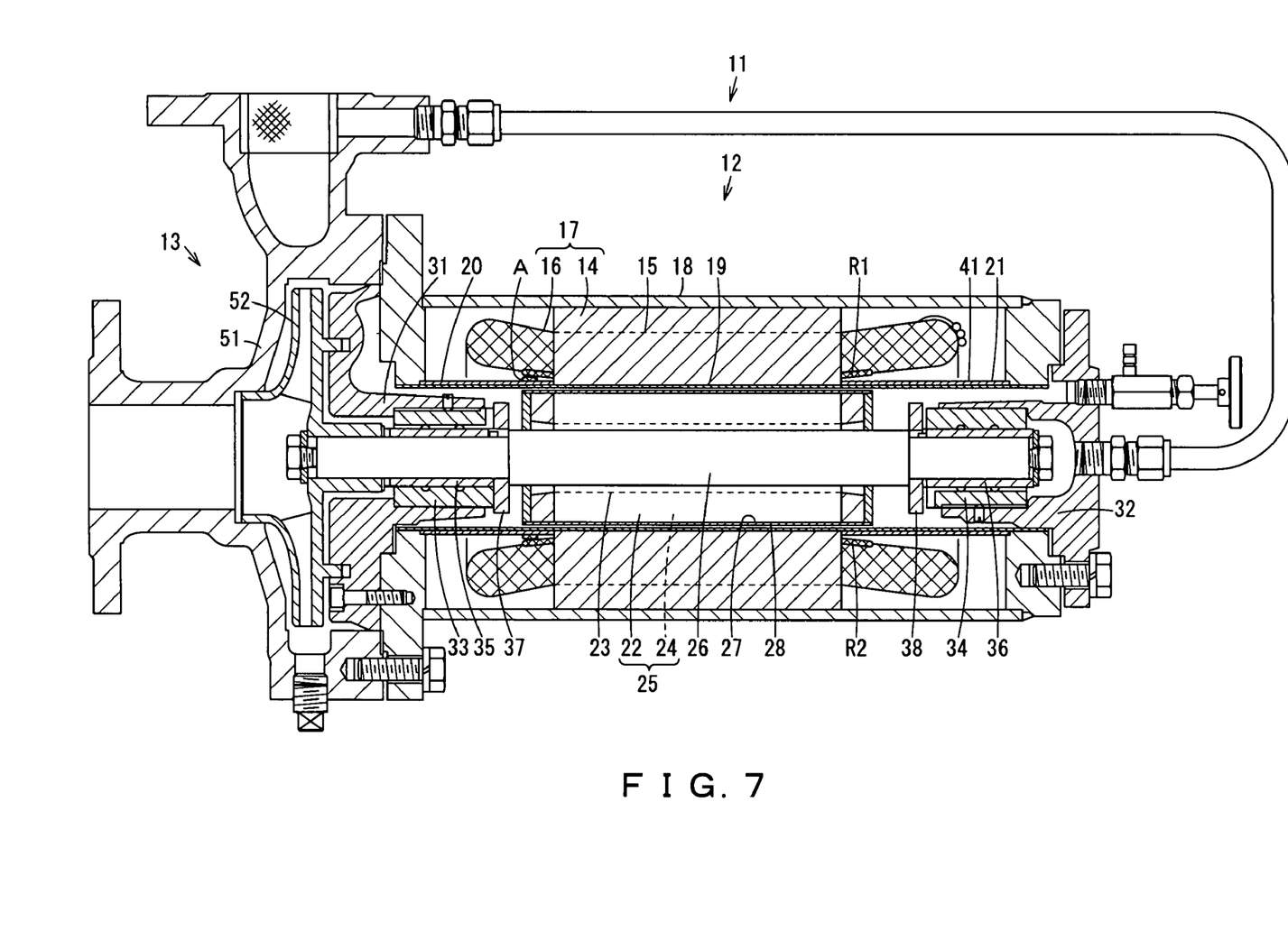
FIG. 7 is a sectional view of a canned motor pump that employs a bearing wear detecting device according to another embodiment of the present invention.

As shown in FIG. 7, the axial position detecting coil A may be wound around the cylindrical outer surface of the reinforcing ring 20, which is provided near the front end of the stator 17. This configuration offers the functions and the effects similar to those achieved by providing the axial position detecting coil A around the cylindrical outer surface of the reinforcing ring 21, which is provided near the rear end of the stator 17.

Figure 8:
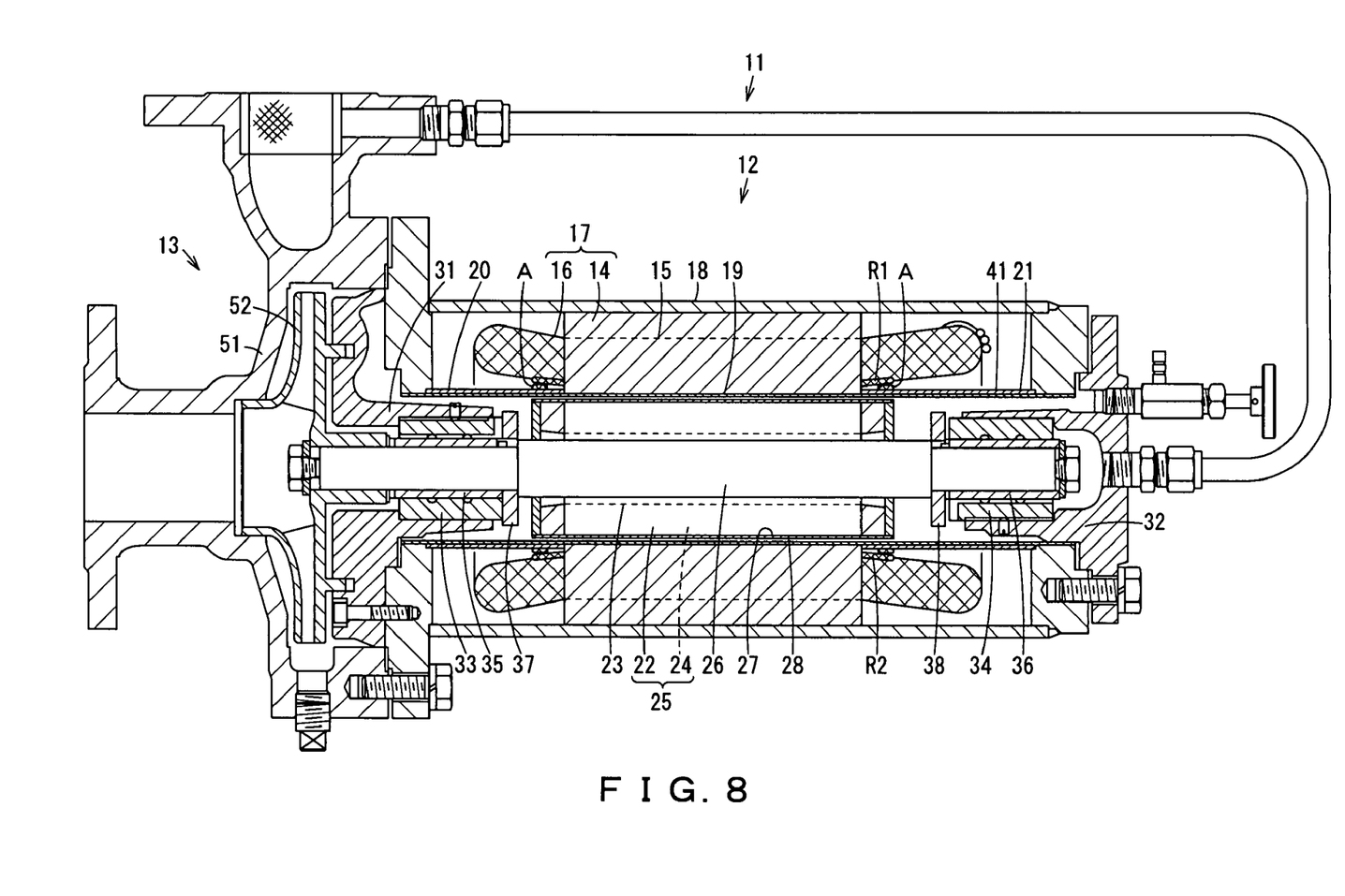
FIG. 8 is a sectional view of a canned motor pump that employs a bearing wear detecting device according to a further embodiment of the present invention.

As shown in FIG. 8, an axial position detecting coil A may be wound around the cylindrical outer surface of each one of the reinforcing rings 20,21, which are respectively provided near the front and rear ends of the stator 17. If such is the case, in addition to the functions and the effects similar to those achieved by providing an axial position detecting coil A around the cylindrical outer surface of the reinforcing ring 21, which is provided near the rear end of the stator 17, detection precision is improved because of the provision of two axial position detecting coils A.

Figure 9:
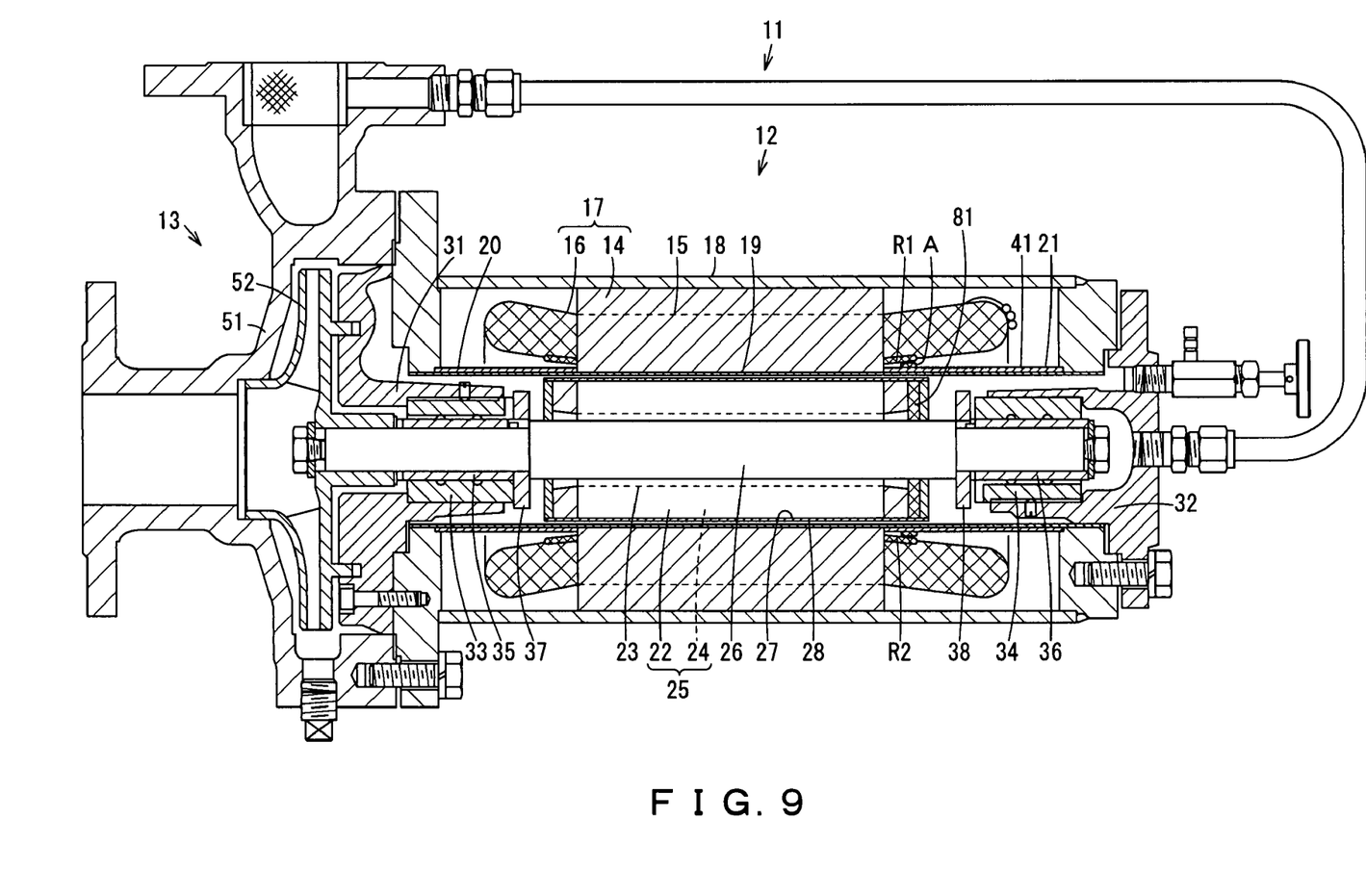
FIG. 9 is a sectional view of a canned motor pump that employs a bearing wear detecting device according to an embodiment of the present invention.

As shown in FIG. 9, a ring-shaped magnetic member 81 may be provided at the end of the rotor 25 at the location corresponding to the axial position detecting coil A in order to increase the detection sensitivity of the axial position detecting coil A, thereby ensuring precise detection of the axial position of the rotor 25.

Figure 10:
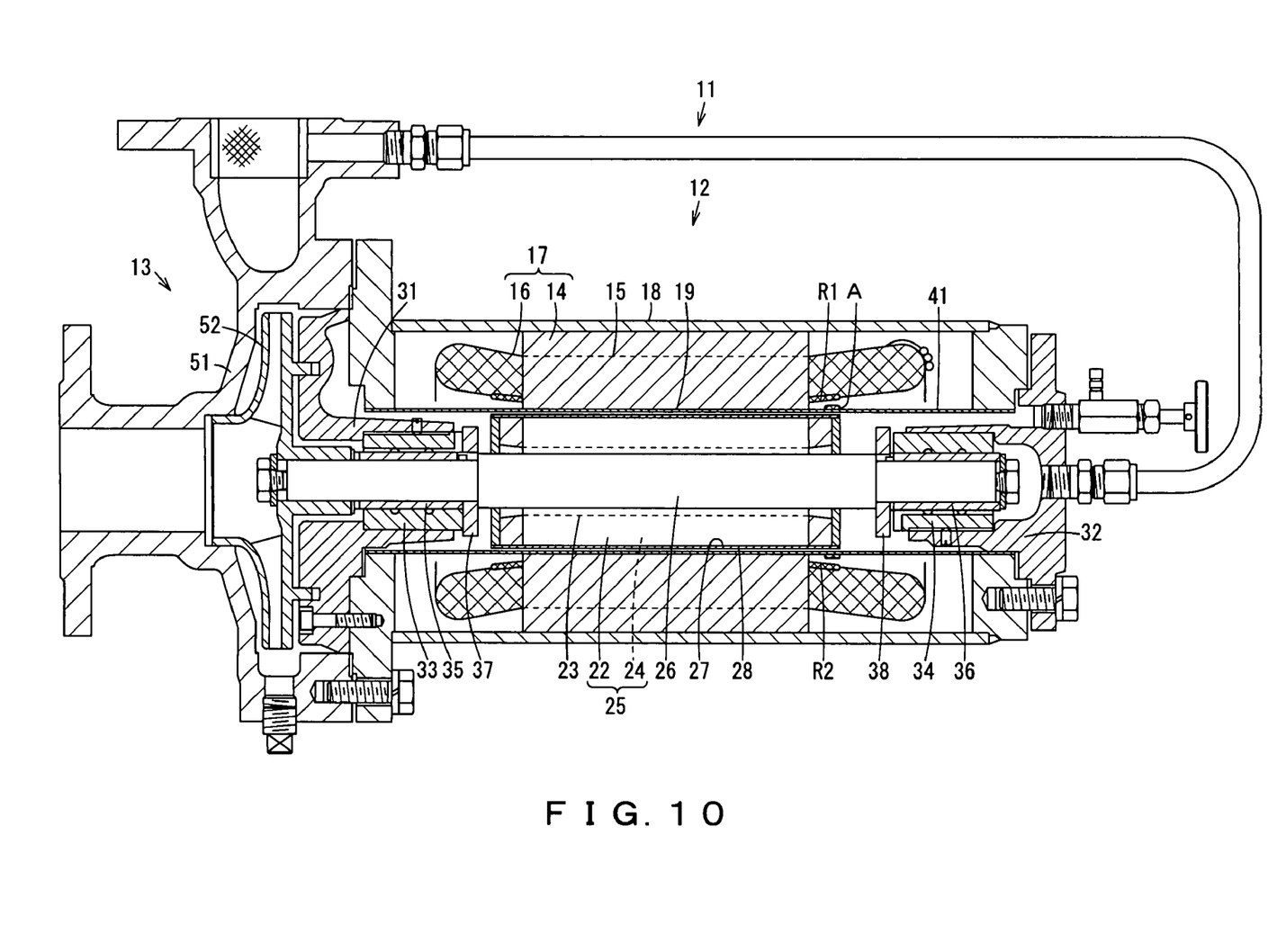
FIG. 10 is a sectional view of a canned motor pump that employs a bearing wear detecting device according to a further embodiment of the present invention.

As shown in FIG. 10, the stator can 19 may serve as the container 41 around which the axial position detecting coil A is wound. As this configuration enables the axial position detecting coil A to be wound with direct contact around the cylindrical outer surface of the stator can 19 so that the axial position detecting coil A is positioned closer the rotor 25, the detection sensitivity is increased.

Although it is not explicitly shown in the drawings, the zero adjustment unit 77 may be included in the control circuit 61 instead of being provided outside the control circuit 61.

Furthermore, it is not essential that the radial position detecting device 74 performs detection based on a difference in induced voltages; it may use inductances to perform detection.

Each radial position detecting coil R1,R2 may be a detection coil provided at an end of the stator 17 instead of being wound along the entire axial length of a tooth of the stator 17.

Furthermore, as an alternative way to perform temperature correction for eliminating the influence of the temperature of the axial position detecting coil A, the stator 17 may be provided with such a temperature measuring means as a thermocouple or a resistance thermometer sensor to measure the temperature of the axial position detecting coil A, and the control unit 70 may be provided with a temperature correction means for correcting the detected value based on the temperature measured by the temperature measuring means.

Instead of winding the axial position detecting coil A with direct contact around the stator can 19 or the reinforcing ring 21, it is possible to wind the axial position detecting coil A around a spool having a drum-like shape and subsequently attaching the spool to the stator can 19 or the reinforcing ring 21.

It is also possible to use any one of the configuration described above combined with one or more of the other configurations.

Although the invention is explained as above referring to various embodiments in which the canned motor 12 is used in the canned motor pump 11, the canned motor may be used in a canned motor agitator, a canned motor blower, or the like.

The range of usage of a bearing wear detecting device according to the invention is not limited to a canned motor 12; it can be used in any type of motor that employs slide bearings, including a wet motor.

What is claimed is:

1. A motor bearing wear detecting device comprising:
a single axial position detecting coil provided near one end of a stator of a motor in such a manner as to be circumferentially wound around a cylindrical outer surface of a container that contains at least part of a rotor of said motor, and an axial position detecting device detecting the axial position of said rotor by voltages induced in said single axial position detecting coil.

2. A motor bearing wear detecting device as claimed in claim 1, wherein:
said container is one of a stator can and a reinforcing ring that is provided around said stator can.

3. A motor bearing wear detecting device as claimed in claim 1, wherein:
said motor bearing wear detecting device having a magnetic member provided at an end of the rotor, where said single axial position detecting coil is located.

4. A motor bearing wear detecting device as claimed in claim 2, wherein: said motor bearing wear detecting device has a magnetic member provided at an end of the rotor, where said single axial position detecting coil is located.

5. A motor bearing wear detecting device comprising:
a single axial position detecting coil provided near one end of a stator of a motor in such a manner as to be circumferentially wound around a cylindrical outer surface of a container that contains at least part of a rotor of said motor,
a high frequency signal applying device applying high frequency signals to said single axial position detecting coil,
an inductance detecting device detecting the inductance of said single axial position detecting coil to which a high frequency signal has been applied, and
an axial position detecting device detecting the axial position of said rotor by the inductance of said single axial position detecting coil.

6. A motor bearing wear detecting device as claimed in claim 5, wherein:
said axial position detecting device comprises:
a temperature measuring means for measuring the temperature of said single axial position detecting coil and
a temperature correction device performing temperature correction based on the temperature measured by said temperature measuring device.

7. A motor bearing wear detecting device as claimed in claim 6, wherein: said container is one of a stator can and a reinforcing ring that is provided around said stator can.

8. A motor bearing wear detecting device as claimed in claim 7, wherein: said motor bearing wear detecting device has a magnetic member provided at an end of the rotor, where said single axial position detecting coil is located.

9. A motor bearing wear detecting device as claimed in claim 6, wherein: said motor bearing wear detecting device having a magnetic member provided at an end of the rotor, where said single axial position detecting coil is located.

10. A motor bearing wear detecting device as claimed in claim 5, wherein:
said high frequency signal applying device applies to said single axial position detecting coil a high frequency signal generated by superimposing DC current over a sine wave, said DC current having the same value as an effective value of the sine wave;
said motor bearing wear detecting device having:
a sine wave signal detecting device detecting a sine wave signal from among the signals output from said single axial position detecting coil, to which the high frequency signal has been applied; and
a DC resistance detecting device detecting a DC resistance value from among the signals output from said single axial position detecting coil, to which the high frequency signal has been applied; and
said inductance detecting device detects an inductance of said axial position detecting coil, said inductance being a sine wave signal detected by said sine wave signal detecting device after subtracting therefrom the DC resistance value detected by said DC resistance detecting device.

11. A motor bearing wear detecting device as claimed in claim 10, wherein: said container is one of a stator can and a reinforcing ring that is provided around said stator cam.

12. A motor bearing wear detecting device as claimed in claim 11, wherein: said motor bearing wear detecting device has a magnetic member provided at an end of the rotor, where said single axial position detecting coil is located.

13. A motor bearing wear detecting device as claimed in claim 10, wherein: said motor bearing wear detecting device has a magnetic member provided at an end of the rotor, where said single axial position detecting coil is located.

14. A motor bearing wear detecting device as claimed in claim 5, wherein: said container is one of a stator can and a reinforcing ring that is provided around said stator can.

15. A motor bearing wear detecting device as claimed in claim 14, wherein: said motor bearing wear detecting device has a magnetic member provided at an end of the rotor, where said single axial position detecting coil is located.

16. A motor bearing wear detecting device as claimed in claim 5, wherein: said motor bearing wear detecting device has a magnetic member provided at an end of the rotor, where said single axial position detecting coil is located.

* * * * *